(12) United States Patent
Sato

(10) Patent No.: US 7,631,907 B2
(45) Date of Patent: Dec. 15, 2009

(54) LOCKING DEVICE FOR VEHICLE

(75) Inventor: Yusuke Sato, Utsunomiya (JP)

(73) Assignee: Kabushiki Kaisha Imasen Denki Seisakusho, Aichi (JP)

( * ) Notice: Subject to any disclaimer, the term of this patent is extended or adjusted under 35 U.S.C. 154(b) by 51 days.

(21) Appl. No.: 11/852,372

(22) Filed: Sep. 10, 2007

(65) Prior Publication Data
US 2008/0060397 A1 Mar. 13, 2008

(30) Foreign Application Priority Data
Sep. 11, 2006 (JP) .............................. 2006-245574

(51) Int. Cl.
*E05C 3/06* (2006.01)
(52) U.S. Cl. .............................. 292/216; 292/DIG. 73; 292/DIG. 56; 296/65.03; 297/336; 297/378.13
(58) Field of Classification Search ................ 292/216, 292/201, DIG. 23, DIG. 73, DIG. 42, DIG. 64, 292/DIG. 55, DIG. 56; 296/65.03; 297/336; 297/378.13; 248/503.1, 503
See application file for complete search history.

(56) References Cited
U.S. PATENT DOCUMENTS

| | | | | |
|---|---|---|---|---|
| 6,695,362 | B2 * | 2/2004 | Kluting et al. .............. | 292/216 |
| 6,945,585 | B1 * | 9/2005 | Liu et al. .................. | 296/65.03 |
| 7,108,305 | B2 * | 9/2006 | Frazier et al. ............. | 296/65.03 |
| 7,140,649 | B1 * | 11/2006 | Gregory ...................... | 292/48 |
| 7,198,307 | B2 * | 4/2007 | Drysdale et al. ............ | 292/216 |
| 7,243,974 | B2 * | 7/2007 | Kondo et al. ............. | 296/65.03 |
| 7,296,840 | B2 * | 11/2007 | Martone et al. .......... | 296/65.03 |

FOREIGN PATENT DOCUMENTS

| | | |
|---|---|---|
| JP | 6147266 | 2/1983 |
| JP | 2993861 | 8/1996 |

* cited by examiner

*Primary Examiner*—Peter M. Cuomo
*Assistant Examiner*—Mark Williams
(74) *Attorney, Agent, or Firm*—Lucas & Mercanti, LLP

(57) ABSTRACT

The present invention realizes a locking device for vehicle free from the occurrence of rattle at the portion where the striker is locked. When a lock plate 5 and a latch plate 4 are brought into a locked state and a latch-side recessed portion 4d of the latch plate 4 is engaged with a striker 20, a plate pressing cam 7 rotates clockwise by a restoring force by a coil spring 12, so that its depressing-side cam portion 7e depresses a tip end 6c of a rattle-removing plate 6. A rattle removing-side recessed portion 6d of the rattle-removing plate 6 engages with the peripheral surface of the striker 20, to suppress the rattle of the striker 20. Since the rattle removing-side recessed portion 6d is formed into the shape that matches the peripheral surface of the striker 20, occurrence of rattle can be strictly suppressed.

4 Claims, 10 Drawing Sheets

Front view

Frontal perspective view

Backside view

Fig.4 Internal frontal perspective view

Internal frontal perspective view 2

Fig. 6 Internal backside perspective view

Fig. 7
Internal backside perspective view 2
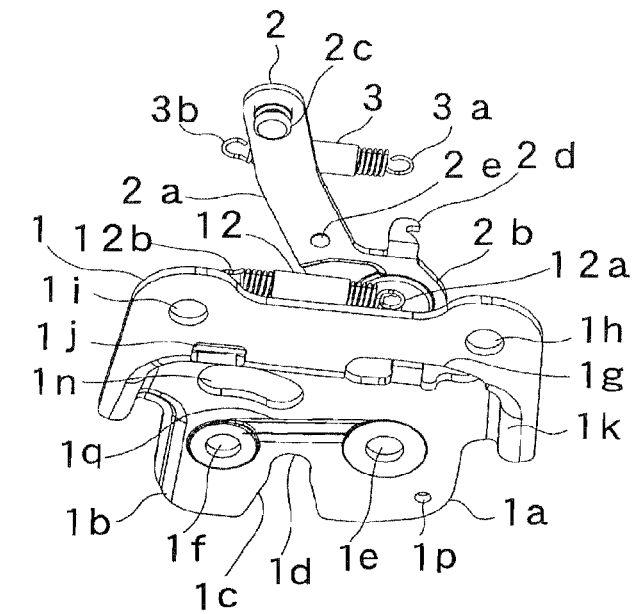
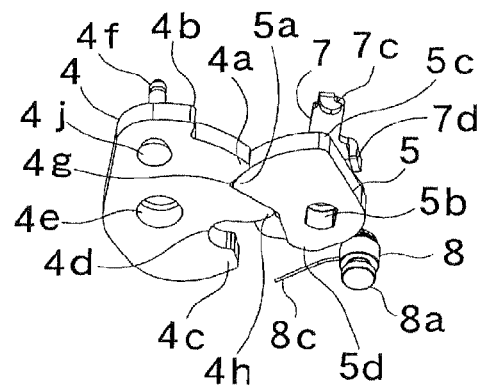
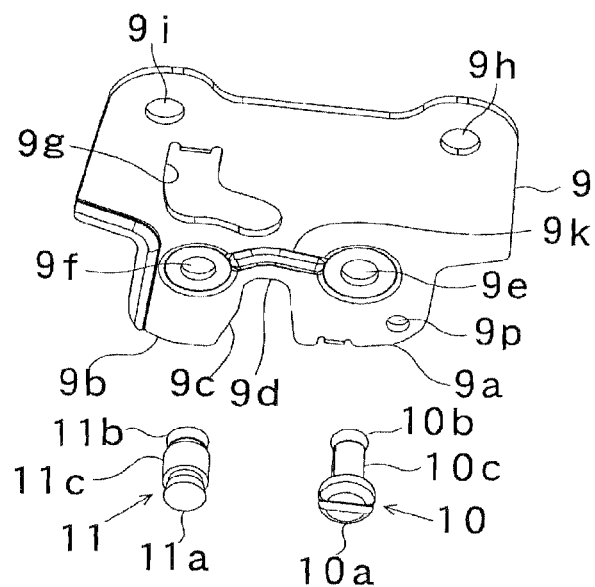

Fig. 8
(1) Lock-off state
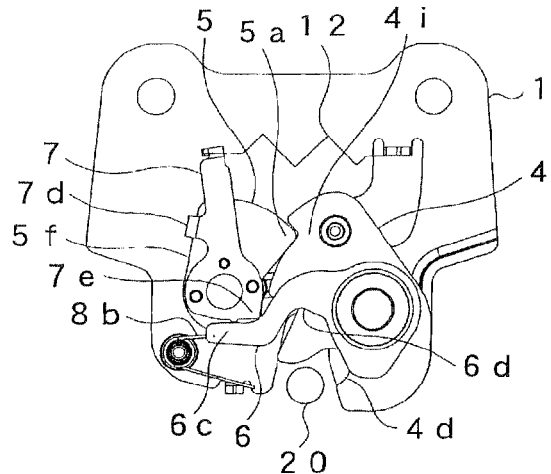
(3) Cam operation 1
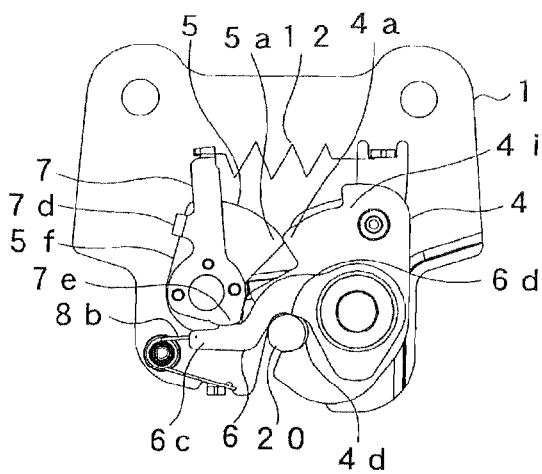
(2) Moment when lock-off is released
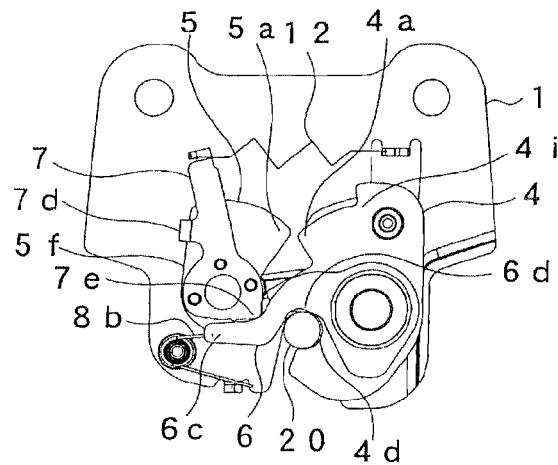
(4) Cam operation 2
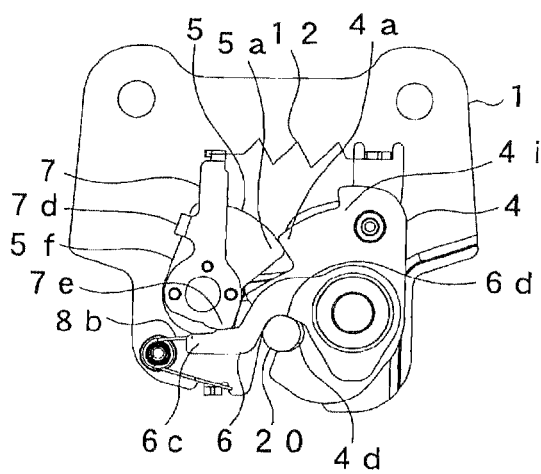
(5) Locked state
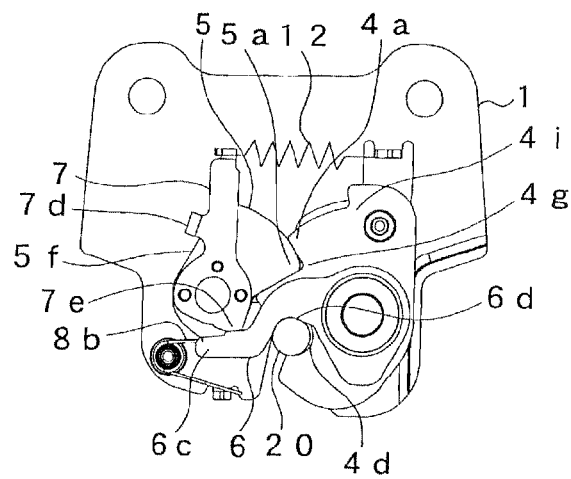

LOCKING DEVICE FOR VEHICLE

CROSS-REFERENCE TO RELATED APPLICATION

The present application claims priority under 35 U.S.C. § 119 to Japanese Patent Application No. JP2006-245574. The content of the application is incorporated herein by reference.

BACKGROUND OF THE INVENTION

1. Field of the Invention

The present invention relates to a locking device for vehicle applied as a device for locking a bottom surface of a vehicle seat with a floor of the vehicle, a device for locking a back door, and the like.

2. Description of the Related Art

Conventionally, as this type of locking devices for vehicle, those described in Prior art 1 and 2 are known. FIG. 9 is a diagram for illustrating a locked state of the locking device for vehicle described in Prior art 1. FIG. 10 is a diagram for illustrating a locked state of the locking device for vehicle described in Prior art 2.

The locking device shown in FIG. 9 is a locking device for back door, and includes: a substrate 51 formed with a striker-entering opening 52 for receiving the entry of a striker 50; a latch 53 to be engaged with the striker 50 that has entered into the striker-entering opening 52; a locking plate 59 to lock a latch 53; a push-back lever 61 for pushing the striker 50 back toward its entering direction; a coil spring 54 for biasing the latch 53 to rotate in a direction in which the striker 50 engaged with the latch 53 departs; a release lever 63 for releasing the locked state; a spring 57 for biasing the release lever 63 in a releasing direction; a spring 58 for biasing the push-back lever 61 in a direction in which the striker 50 is pushed back by an arm portion 61a of the push-back lever 61; a protrusion 55 provided at a tip end of the arm portion 61a; a roller 56 provided at the protrusion 55; and a coil spring 60 for biasing the locking plate 59 in a direction in which the locking plate 59 is locked with the latch 53.

When the back door is closed, the striker 50 enters into the striker-entering opening 52, so that the striker 50 comes into contact with the latch 53, and then, comes into contact with the release lever 63. As a result, the latch 53 and the release lever 63 rotate clockwise. When the striker 50 enters to the fully latched position, the latch 53 is locked with the locking plate 59 to render the striker 50 impossible to be released.

When the striker 50 advances to the deeper site in the striker-entering opening 52, a stopper piece 63a of the release lever 63 is detached from a rotation trail within a window hole 62 of the protrusion 55. As a result, the push-back lever 61 stopped by the stopper piece 63a rotates clockwise, and pushes the striker 50 back by the arm portion 61a of the lever 61 to restrict the striker 50 to a fully latched position.

When the handle is operated in the vehicle, or a key is operated outside the vehicle to rotate the locking plate 59 counter-clockwise, the locked state between the latch 53 and the locking plate 59 is released. As a result, the latch 53 is rotated counter-clockwise by the coil spring 54, and at the same time, the push-back lever 61 is rotated clockwise by the spring 58 and the striker 50 departs from the striker-entering opening 52.

The locking device shown in FIG. 10 is a device for locking the vehicle seat to the floor, and includes: a base plate 81 formed with a striker-entering groove 87; a latch 85 to be engaged with the striker 86 that has entered the striker-entering groove 87; a biasing spring 84 for biasing the latch 85 counter-clockwise; a locking plate 83 for locking the latch 85; a striker-restricting member 80 for restricting movement of the striker 86; and an operating portion 88 that has integrated with the striker restricting portion 80.

When the seat is returned from a tilted state to a floor-standing state, the striker 86 enters the striker-entering groove 87 and the striker 86 comes into contact with the latch 85 and the latch 85 rotates clockwise. The locking plate 83 is pushed by an arcuate surface of a latch engagement portion 85a of the latch 85 and is retracted to a non-restricted position. At this time, the latch 85 rotates beyond the meshed position to reach an over-travel position. At this time, the locking plate 83 is again rotated to a locked position by the biasing spring 84, and at the same time, an engagement hook portion 83a of the locking plate 83 is meshed and locked with a latch engagement portion 85a that returns to the meshed position. Subsequently, a tapered restricting surface 80a of the striker-restricting member 80 comes into contact with the striker 86 by the biasing spring 82.

Prior art 1: Japanese Patent Publication No. 61-47266 (pages 2 to 4, FIGS. 2 and 3) is incorporated herein by reference.

Prior art 2: Japanese Patent No. 2993861 (paragraphs 25 to 31, FIG. 1) is incorporated herein by reference.

SUMMARY OF THE INVENTION

However, in the locking device described in the foregoing Prior art 1, a portion of the arm portion 61a of the push-back lever 61 that comes into contact with the striker 50 is in the shape of a flat surface, and therefore, the arm portion 61a and the striker 50 come into point-contact with each other. In this structure, there is a fear that rattle occurs due to the striker 50 moving within the striker-entering opening 52 along the arm portion 61a.

Further, the striker 50 comes into contact with a push-back lever 61 from the beginning of the entry of the striker 50 into the striker-entering opening 52, and receives a push-back force from the push-back lever 61. Thus, a large force is required for the striker 50 to enter the striker-entering opening 52.

Further, since it is required to use four springs in total, that is, the coil spring 54, springs 57 and 58, and coil spring 60, the frequency of occurrence of troubles caused by the reduction in the spring force increases. In addition, the cost of springs account for a large proportion of the manufacturing cost.

In the locking device described in the foregoing Prior art 2, the restricting surface 80a of the striker-restricting member 80 has a tapered shape. Therefore, even a slight error in the taper angle will result in the shortage of the force for depressing the striker 86, and causes a fear that the striker 50 moves within the striker-entering groove 87 along the arm portion 61a and rattles. Further, since the restricting surface 80a and the striker 86 are in point-contact with each other, friction is small at a point where the restricting surface 80a and the striker 86 contact with each other. This causes a fear that the restricting surface 80a may depart from the depression site. Further, since the restricting surface 80a enters the depression site as it is rotating, there is a fear that, if a force opposite to the rotating direction is exerted to the striker 86, the striker 86 may depart from the depression site.

In view of the circumstances described above, a main objective of the present invention is to achieve a locking device for vehicle that is free from a problem that a site where the striker is locked rattles.

A locking device for vehicle is comprised:

a base plate (9) in the shape of plate having, at its perimeter, a base-side recessed portion (9d) which is a recessed portion to be engaged with a striker (20) mounted to the vehicle;

a latch plate (4) in the shape of plate having, at its perimeter, a latch-side recessed portion (4d) which is a recessed portion to be engaged with the striker, a latch-side first locking portion (4i) which is a first locking portion, and a latch-side second locking portion (4g) which is a second locking portion;

a lock plate (5) in the shape of plate having, at its perimeter, a lock-side cam portion (5a) which is a cam portion to be locked with the latch-side first locking portion to keep the latch-side recessed portion in a state of being unengaged with the striker, and to be locked with the latch-side second locking portion to keep the latch-side recessed portion in a state of being engaged with the striker;

a latch-side shaft member (11) with its tip end protruded from one plate surface of the base plate, for pivotally supporting the latch plate;

a lock-side shaft member (10) with its tip end protruded from one plate surface of the base plate, for pivotally supporting the lock plate;

a rattle-removing member (6) including a base end (6a) pivotally supported by the latch-side shaft member protruded from one plate surface of the latch plate, a tip end (6c) extending toward the lock plate, and a rattle removing-side recessed portion (6d) which is a recessed portion formed between the tip end and the base end into the shape that matches the peripheral surface of the striker to be engaged with the peripheral surface of the striker;

a depressing member (7) pivotally supported by the lock-side shaft member protruded from one plate surface of the lock plate, having a depression-side cam portion (7e) at its perimeter which is a cam portion for depressing the tip end of the rattle-removing member, and rotating to depress the tip end of the rattle-removing member by the depression-side cam portion when a locked state between the latch-side first locking portion and the lock-side cam portion changes into a locked state between the latch-side second locking portion and the lock-side cam portion;

biasing means for depressing (12) which is biasing means for biasing the depressing member to rotate in a direction in which the depression-side cam portion depresses the tip end of the rattle-removing member;

an operating member (2) having a base end (2b) pivotally supported by the lock-side shaft member protruded from one surface of the depressing member, for rotating interlockingly with the lock plate;

a depression controlling means (7d) for restricting the rotation of the depressing member to prevent the depression-side cam portion from depressing the tip end of the rattle-removing member, and as the lock plate rotates when the locked state between the latch-side second locking portion and the lock-side cam portion is released, allowing the depressing member to rotate in a direction in which depression to the tip end of the rattle-removing member by the depression-side cam portion is released;

biasing means for locking (3) which is a biasing member for biasing the operating member and the latch plate to respectively rotate in a direction in which a locked state between the latch-side first locking portion or the latch-side second locking portion and the lock-side cam portion is kept; and free rotation preventing biasing means (8) which is biasing means for biasing the tip end of the rattle-removing member to prevent the rattle-removing member from freely rotating in a state where the rattle-removing member is not depressed by the depressing member, wherein the base-side recessed portion, the latch-side recessed portion, and the rattle removing-side recessed portion are structured to be engaged with the striker.

Since the rattle removing-side recessed portion to be engaged with the peripheral surface of the striker is formed into the shape that matches with the peripheral surface of the striker, the striker engaged with the rattle removing-side recessed portion never moves, and thus, there is no possibility that rattle occurs.

Further, it is sufficient to provide only three pieces of biasing means in total, that is, the coil springs 2, 12, and the free rotation preventing member 8, to the locking device for vehicle 30. Thereby, the number of the biasing means can be reduced by one with respect to the conventional device (Prior art 1).

Since the number of the biasing means is reduced by one, the frequency of occurrence of failure resulted from the reduction in the biasing force of the biasing means can be lowered. Further, the proportion of the manufacturing cost for the biasing means to the manufacturing cost of the locking device for vehicle can be reduced by the reduced one biasing means.

Further, the lock plate, the plate pressing member, and the operating member are pivotally supported by one and the same lock-side shaft member. The latch plate and the rattle-removing member are pivotally supported by one and the same latch-side shaft member. Since the number of pieces of shaft member can be maintained to minimum, the device can be small-sized and light-weighted.

In accordance with the more preferred teaching of the present invention, in the locking device (30) for vehicle of the present invention, when the striker is inserted into the base-side recessed portion in a state where the latch-side first locking portion (4i) and the lock-side cam portion (5a) are locked with each other, whereas the base-side recessed portion (9d), the latch-side recessed portion (4d), and the rattle removing-side recessed portion (6d) are not engaged with the striker (20), the latch-side recessed portion is pushed by the striker to cause the latch plate (4) to rotate against the biasing force of the biasing means for locking (3), and when the locked state between the latch-side first locking portion and the lock-side cam portion is released, the latch plate rotates in a direction in which the latch-side second cam portion (4g) and the lock-side cam portion are meshed with each other by the biasing force of the biasing means for locking, and as this rotation proceeds, the depressing member (7) is released from the restriction by the depression controlling means (7d) and is rotated by the biasing force of the biasing means for depression, so that the latch-side second locking portion and the lock-side cam portion are locked with each other to engage the latch-side recessed portion with the striker, and the depressing-side cam portion (7e) depresses the tip end (6c) of the rattle-removing member (6) so as to engage the rattle removing-side recessed portion with the peripheral surface of the striker.

The depressing member is rotated by the biasing force of the biasing means for depression after the latch-side recessed portion is pushed by the striker and the locked state between the latch-side first locking portion and the lock-side cam portion is released. Then, the depressing-side cam portion depresses the tip end of the rattle-removing plate, so that the rattle removing-side recessed portion is engaged with the peripheral surface of the striker.

In other words, when the latch-side recessed portion is pushed by the striker, the rattle-removing plate does not operate in the direction of pushing back the striker. Thereby, small force is sufficient for the striker to enter the latch-side recessed portion.

In accordance with the more preferred teaching of the present invention in the locking device (30) for vehicle of the present invention, the rattle removing-side recessed portion (6d) is engaged with a peripheral surface of the striker (20) that faces the peripheral surface with which the latch-side recessed portion (4d) is engaged.

Since the rattle removing-side recessed portion of the rattle-removing plate is engaged with the peripheral surface of the striker that faces the peripheral surface with which the latch-side recessed portion of the latch plate is engaged, the striker is brought into a state where its peripheral surface is pinched between the rattle removing-side recessed portion and the latch-side recessed portion. Thereby, occurrence of rattle at the engagement portion of the striker can be strictly suppressed.

The reference numerals in parenthesis above correspond to the reference numerals to be used in the embodiment described below.

BRIEF DESCRIPTION OF THE DRAWINGS

FIG. 7 is a rear perspective view showing the internal structure of the locking device for vehicle shown in FIG. 1;

FIGS. 8(1) to 8(5) are operation illustrating diagram for illustrating the movement of the locking device for vehicle shown in FIG. 1;

DETAILED DESCRIPTION OF THE PREFERRED EMBODIMENTS OF THE INVENTION

An embodiment of the locking device for vehicle according to the present invention will be described with reference to the drawings. In this embodiment, description will be made as to a locking device for vehicle provided on a vehicle seat for detachably mounting the vehicle seat to the vehicle floor as an example.

Figure 1:
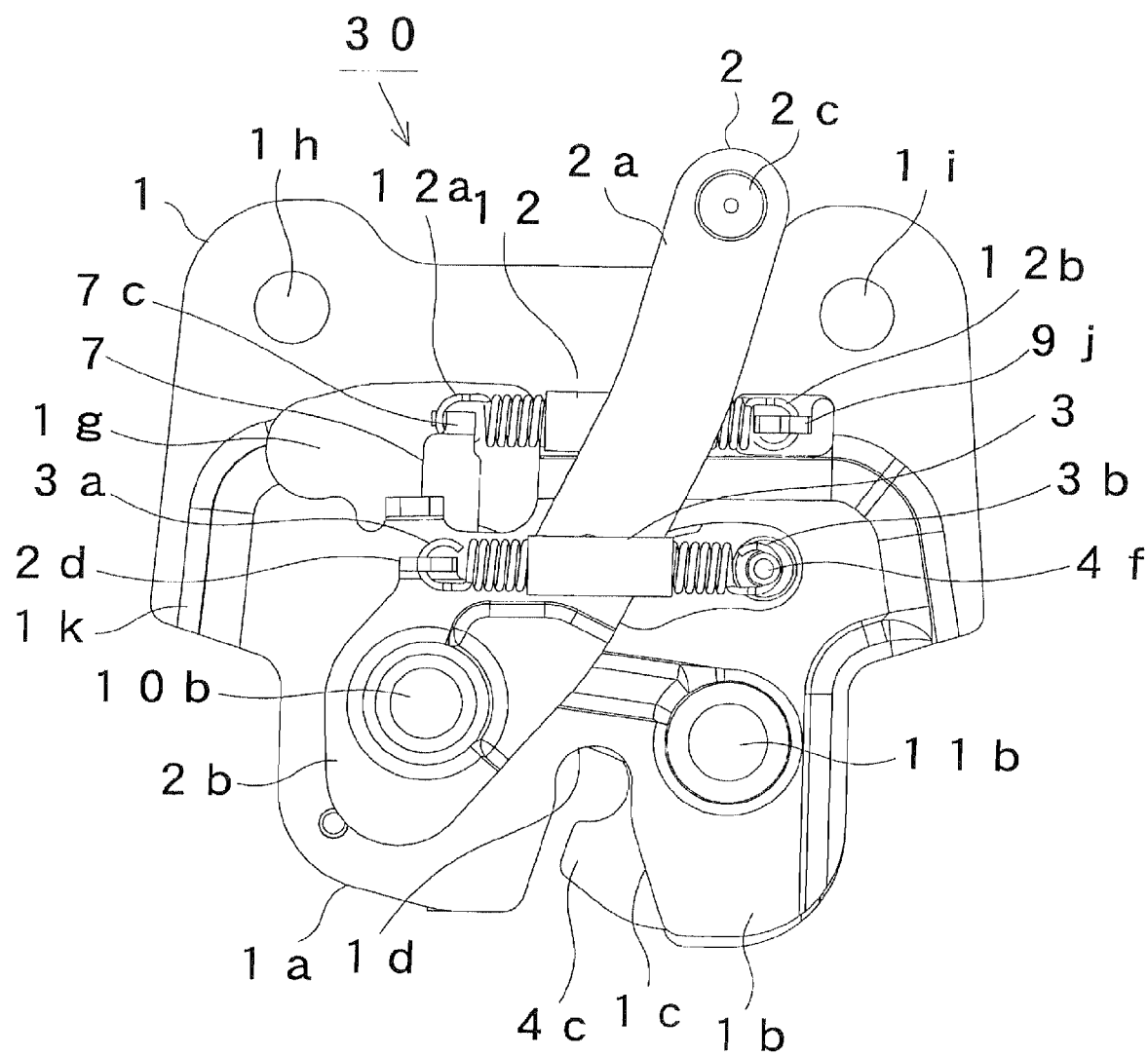
FIG. 1 is a front view of a locking device for vehicle.
Figure 2:
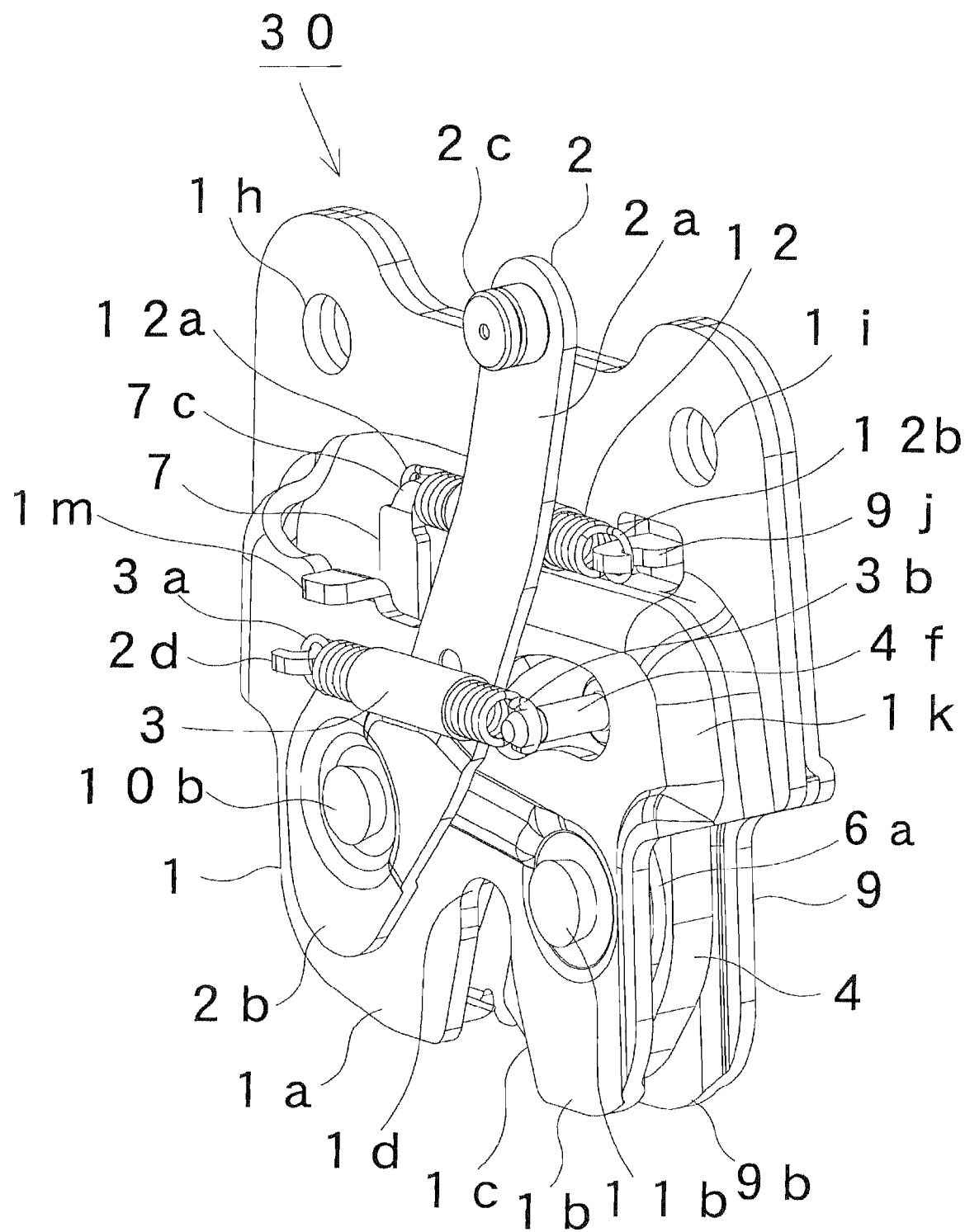
FIG. 2 is a frontal perspective view of the locking device for vehicle shown in FIG. 1.
Figure 3:
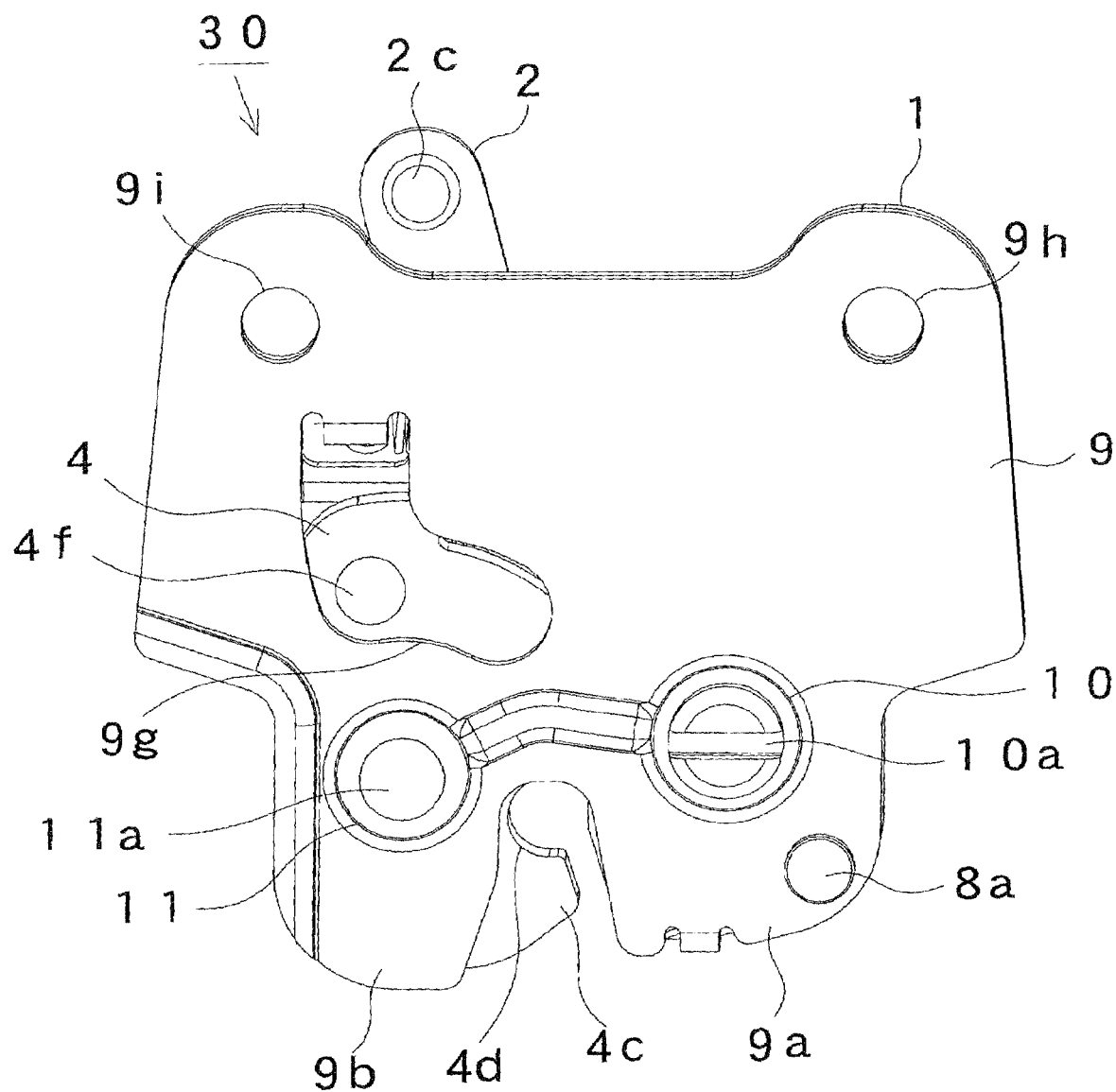
FIG. 3 is a rear view of the locking device for vehicle shown in FIG. 1.
Figure 4:
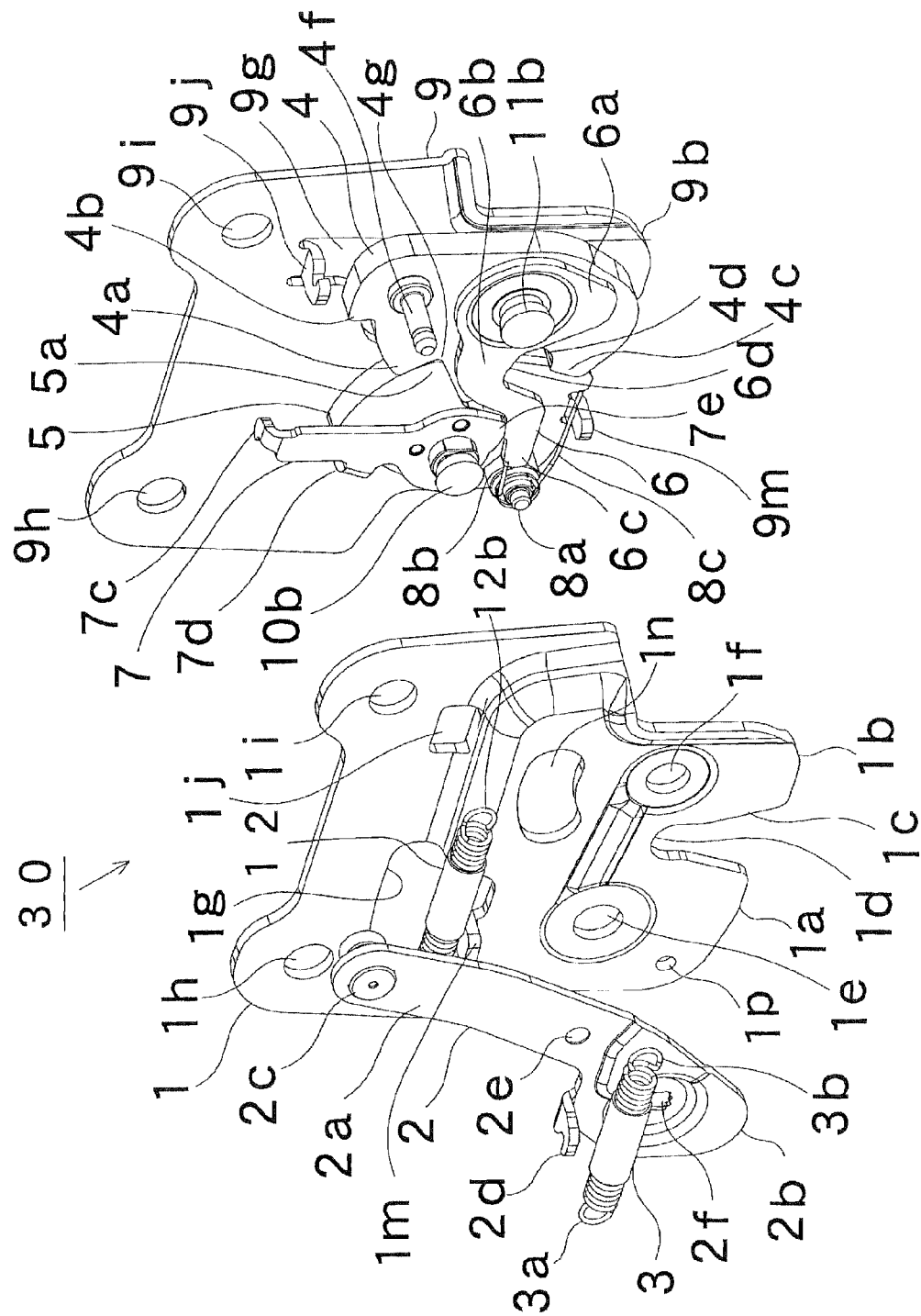
FIG. 4 is a frontal perspective view showing an internal structure of the locking device for vehicle shown in FIG. 1.
Figure 5:
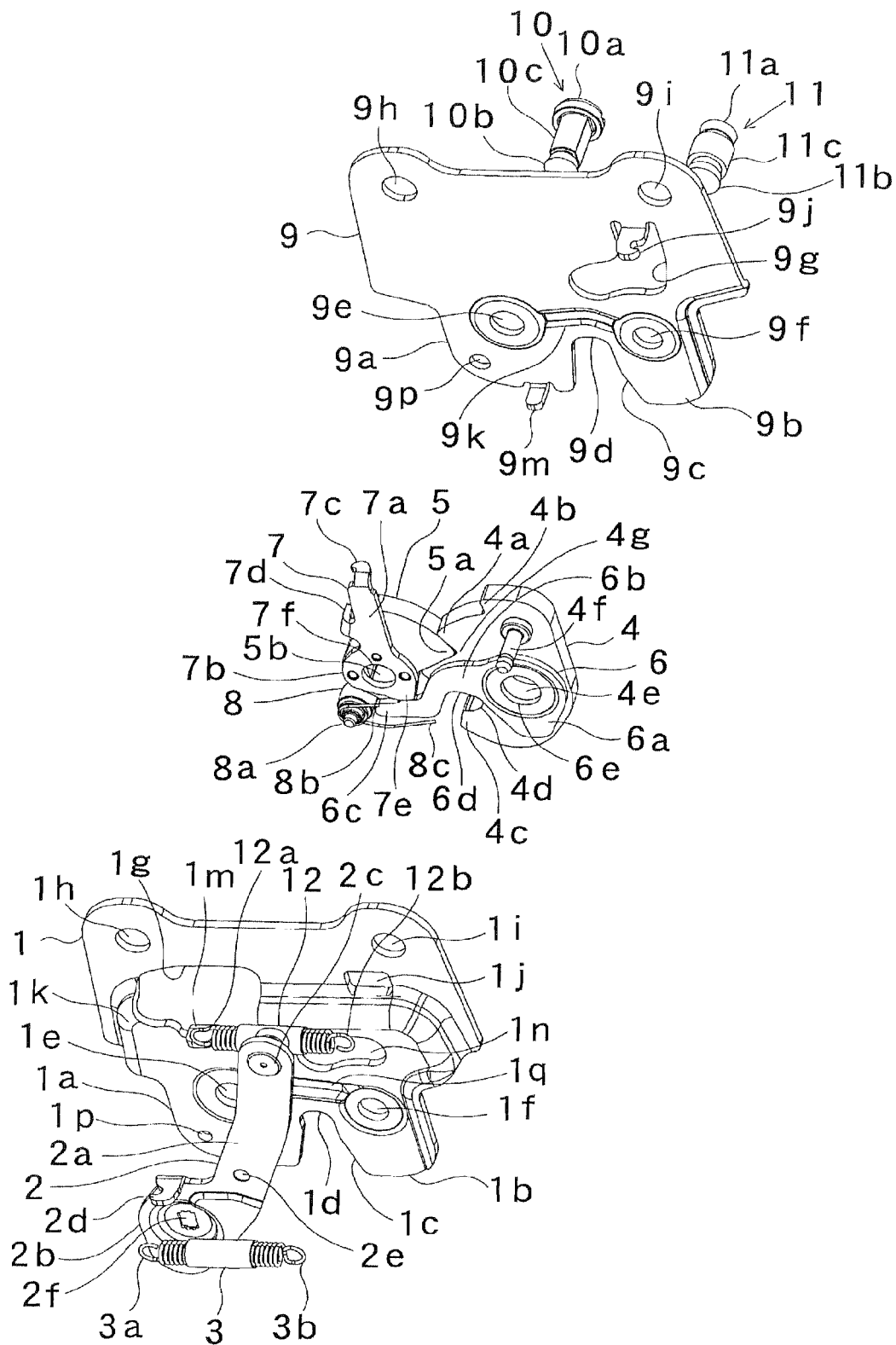
FIG. 5 is a frontal perspective view showing an internal structure of the locking device for vehicle shown in FIG. 1.
Figure 6:
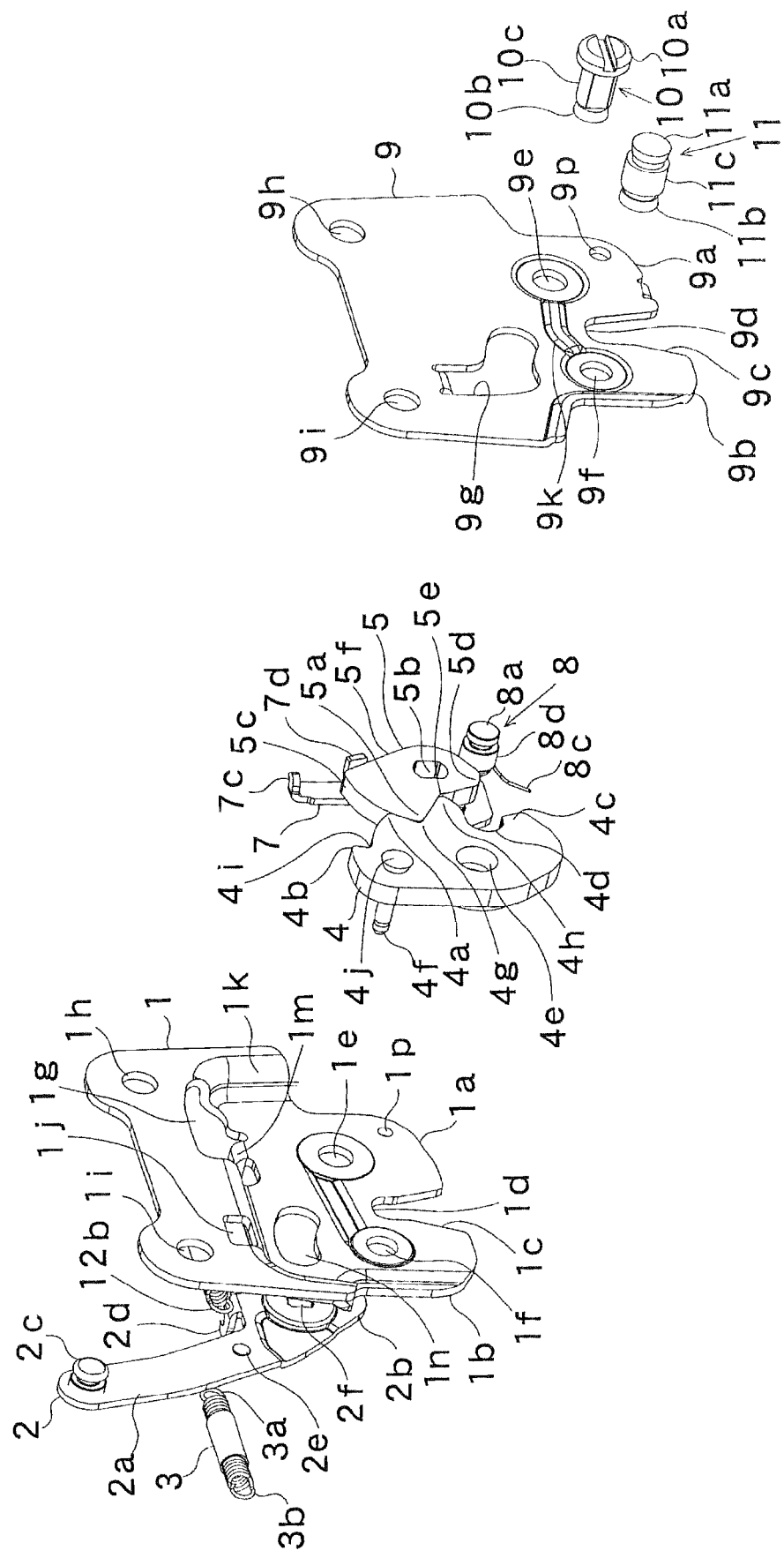
FIG. 6 is a rear perspective view showing the internal structure of the locking device for vehicle shown in FIG. 1.
Figure 9:
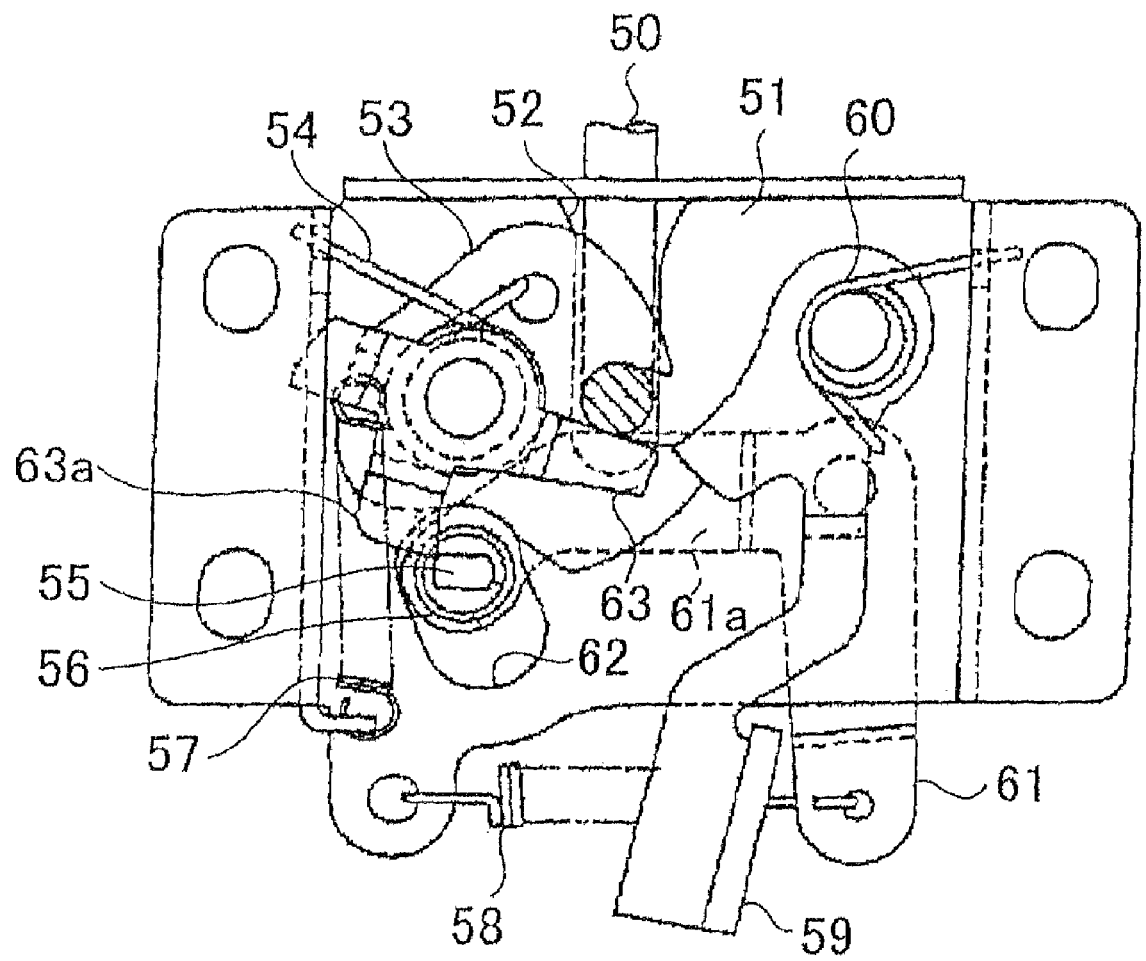
FIG. 9 is a diagram for illustrating a locked state of the locking device for vehicle described in Prior art 1.
Figure 10:
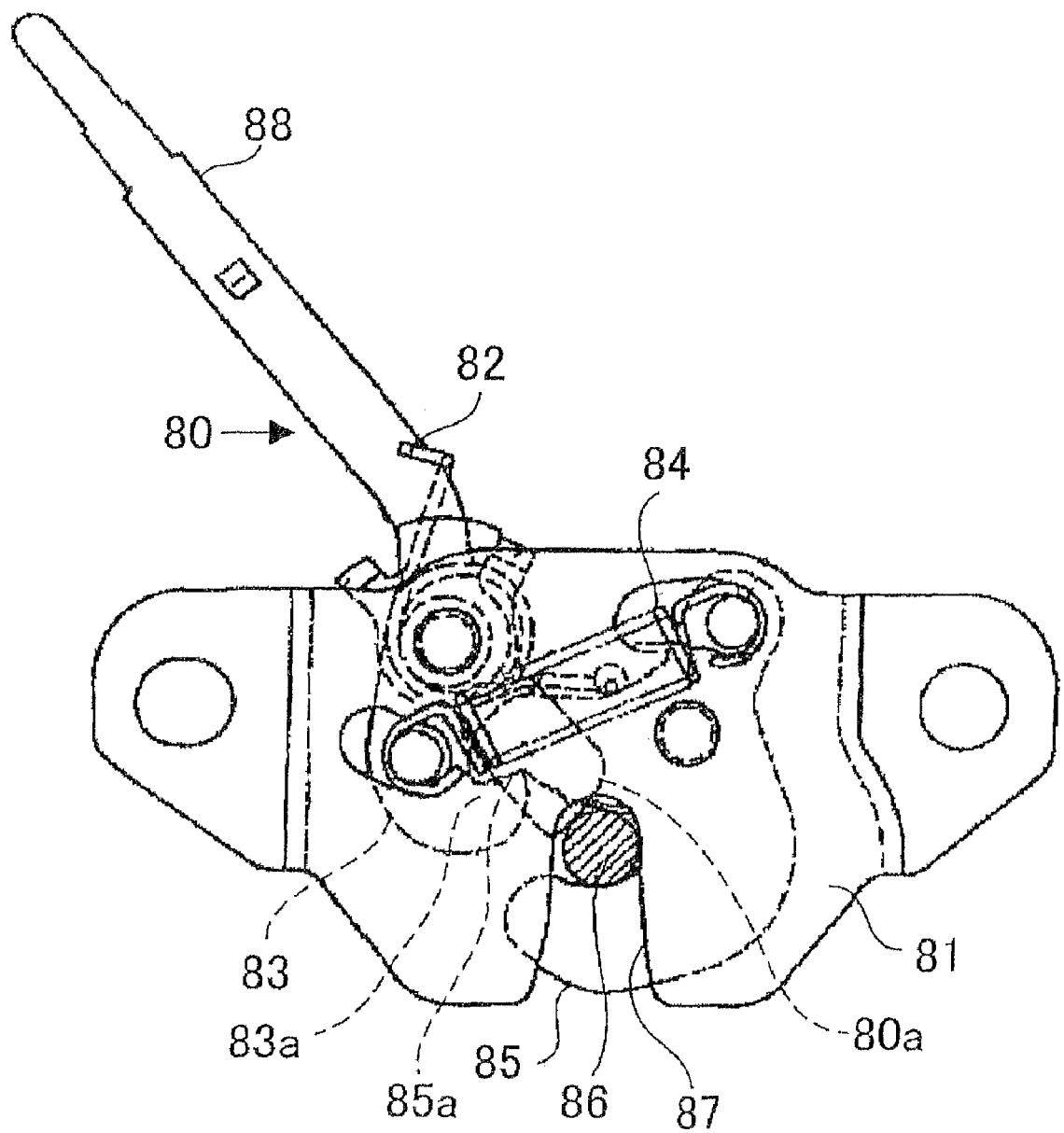
FIG. 10 is a diagram for illustrating a locked state of the locking device for vehicle described in Prior art 2.

FIG. 1 is a front view of a locking device for vehicle. FIG. 2 is a frontal perspective view of the locking device for vehicle shown in FIG. 1. FIG. 3 is a backside view of the locking device for vehicle shown in FIG. 1. FIGS. 4 and 5 are frontal perspective views each showing an internal structure of the locking device for vehicle shown in FIG. 1. FIGS. 6 and 7 are back perspective views each showing the internal structure of the locking device for vehicle shown in FIG. 1. FIGS. 8(1) to 8(5) are operation illustrating diagram for illustrating the movement of the locking device for vehicle shown in FIG. 1.

In the following description, as shown in FIG. 8, it is assumed that the striker 20 is mounted on the vehicle floor, and the locking device for vehicle 30 is mounted at an end portion on the bottom surface of the vehicle seat.

(Base Plate)

As shown in FIGS. 4 to 7, the locking device for vehicle 30 includes a plate-like front base plate 1 and a plate-like rear base plate 9. The front base plate 1 and the rear base plate 9 are formed to have a substantially similar outer shape. On the perimeter of the front base plate 1, a front entering groove 1c is formed into the shape of a groove for receiving the entry of the striker 20. On the bottom portion of the front entering groove 1c, a front base-side recessed portion 1d is formed to engage with the peripheral surface of the striker 20 of a bar-like shape having a round longitudinal cross section.

The front entering groove 1c is formed to have a width larger than the diameter of the striker 20, and is formed into the shape gradually reducing its width as proceeding from the opening portion toward the depth direction. The front base-side recessed portion 1d is formed into a shape that matches the peripheral surface of the striker 20 (in this embodiment, an arcuate shape). At the corner portions of the front base plate 1, through holes 1h and 1i for insertedly passing through attachment members for attaching the locking device for vehicle 30 to the end portion of the bottom surface of the vehicle seat are piercedly formed.

As shown in FIGS. 5 to 7, a rear entering groove 9c is formed into the shape of a groove for receiving the entry of the striker 20. On the bottom portion of the rear entering groove 9c, a rear base-side recessed portion 9d is formed to engage with the peripheral surface of the striker 20.

The rear entering groove 9c is formed to have a width larger than the longitudinal cross-sectional diameter of the striker 20, and is formed into the shape gradually reducing its width as proceeding from the opening portion toward the depth direction. The rear base-side recessed portion 9d is formed into a shape that matches the peripheral surface of the striker 20 (in this embodiment, an arcuate shape). At the corner portions of the rear base plate 9, through holes 9h and 9i for insertedly passing through attachment members for attaching the locking device for vehicle 30 to the end portion of the bottom surface of the vehicle seat are piercedly formed.

The front entering groove 1c and the rear entering groove 9c, and the front base-side recessed portion 1d and the rear base-side recessed portion 9d are respectively formed at positions corresponding to each other when seen from front. They are structured so as to engage with each other at two locations in the direction along which the bar-like striker 20 extends. In addition, the through holes 1h and 9h and the through holes 1i and 9i are also respectively formed at positions corresponding to each other when seen from front.

As shown in FIGS. 4 and 5, on the front surface of the rear base plate 9, a later-described locking portion 9j for locking a locking portion 12b provided at a right end of a coil spring 12 is formed. In this embodiment, the locking portion 9j is formed by bending a portion of the rear base plate 9 toward the front side. Below the locking portion 9j of the rear base plate 9, a window 9g is piercedly formed to ensure a region where a base portion 4j of a locking member 4f protruding from the back surface of the latch plate 4 moves as the latch plate 4 rotates.

At the lower left position on the rear base plate 9, a through hole 9p for passing a shaft member 8a of a later-described free-rotation preventing member 8 (FIGS. 3, 6, and 7) from the back surface is piercedly formed. Further, at a position near the through hole 9p and at the lower end of the rear base plate 9, a locking member 9m for locking one end 8c of the helical spring of the free-rotation preventing member 8 is formed.

As shown in FIGS. 5 to 7, at the left side of the rear base-side recessed portion 9d in the rear base plate 9, a later-described shaft hole 9e for passing a lock-side shaft member 10 from the back surface is piercedly formed. At a right side of the shaft hole 9e which is also the right side of the rear base-side recessed portion 9d, a later-described shaft hole 9f for passing a latch-side shaft member 11 from the back surface is piercedly formed.

At the left side of the front base-side recessed portion 1d in the front base plate 1, a shaft hole 1e for passing the lock-side shaft member 10 passed through the shaft hole 9e of the rear base plate 9 from the back surface is piercedly formed. At the right side of the shaft hole 1e which is also the right side of the front base-side recessed portion 1d, a shaft hole 1f for passing, from the back surface, the latch-side shaft member 11 passed through the shaft hole 9f of the rear base plate 9 is piercedly formed.

The front base plate 1 is formed into a structure such that its portion bulges toward the front side. On the back surface of the bulging portion, a latch plate 4, a lock plate 5, a plate pressing cam 7 and an accommodating space 1k (see FIG. 7) which is a space for accommodating a rattle-removing plate 6 are formed.

From the front base plate 1, an arm portion 7a of the plate pressing cam 7 accommodated in the foregoing accommodating space 1k is made protruded. Further, the front base plate 1 is formed with a window 1g for ensuring a region where the arm portion 7a rotates as the plate pressing cam 7 rotates.

At the right side of the window 1g, a window 1j for protruding the locking portion 9j of the rear base plate 9 is opened.

At the bulging portion below the window 1j, a later-described window in for passing the locking member 4f protruded from the latch plate 4 is opened. The window in is formed into the shape of an arcuate long hole corresponding to the rotation trail of the locking member 4f which rotates as the latch plate 4 rotates. At the lower left side of the front base plate 1, a later-described through hole 1p for passing the tip end of the shaft member 8a of the free-rotation preventing member 8 is piercedly formed.

(Lock-Side Shaft Member and Latch-Side Shaft Member)

As shown in FIGS. 5 to 7, the locking member 30 for vehicle includes a lock-side shaft member 10 and a latch-side shaft member 11. The lock-side shaft member 10 includes a base portion 10a, a body portion 10c, and a tip end 10b. The body portion 10C is formed in such a way that its cross section does not have a circular shape (in this embodiment, the cross section is substantially square.) The latch-side shaft member 11 comprises a base portion 11a, a body portion 11c, and a tip end 11b. The body portion 11c is formed in such a way that its cross section has a circular shape.

As shown in FIG. 3, both the base portion 10a of the lock-side shaft member 10 and the base portion 11a of the latch-side shaft member 11 are formed to have a diameter larger than the shaft holes 9e and 9f so as not to slip off from the shaft holes.

(Latch Plate)

The locking device for vehicle 30 includes a latch plate 4 and a lock plate 5 for creating a locked state (i.e. an engaged state) and a lock-off state (i.e. a disengaged (released) state) relative to the striker 20. As shown in FIGS. 6 and 7, a shaft hole 4e for passing, from the back side, the latch-side shaft member 11 passed through the shaft hole 9f of the rear base plate 9 is piercedly formed in the latch plate 4. The latch plate 4 rotates clockwise or counter-clockwise about the latch-side shaft member 11 passed through the shaft hole 4e as the center of rotation.

The latch plate 4 is formed into the shape of plate. At its left periphery seen from the front which is a perimeter farther away from the rotation center of the latch plate 4, a latch-side first locking portion 4i and a latch-side second locking portion 4g are formed. A recessed portion formed between the uppermost protruding portion 4b and a protruding portion 4a which is a second uppermost protruding portion is set to the latch-side first locking portion 4i. A recessed portion formed between the protruding portion 4a and a protruding portion 4h which is a third uppermost protruding portion is set to the latch-side second locking portion 4g.

At the lower end of the perimeter of the latch plate 4, a jaw portion 4c is formed. Between the jaw portion 4c and the protruding portion 4h, a latch-side recessed portion 4d is formed. The latch-side recessed portion 4d is a recessed portion to be engaged with the peripheral surface of the striker 20 entered the front entering groove 1c and the rear entering groove 9c. The latch-side recessed portion 4d is formed into an arcuate shape that matches the peripheral surface of the striker 20.

At a position above the shaft hole 4e on the front surface of the latch plate 4, a later-described locking member 4f for locking a locking portion 3b provided at the right end of the coil spring 3 is formed. In this embodiment, the locking member 4f is formed into the shape of bar, and is passed and fixed through the latch plate 4 from the back surface. The locking member 4f may be in any shape as far as it can lock the locking portion 3b provided at the right end of the coil spring 3.

(Lock Plate)

A lock plate 5 is formed with a shaft hole 5b for passing, from the back surface, the lock-side shaft member 10 passed through the shaft hole 9e of the rear base plate 9 is piercedly formed. The lock plate 5 rotates clockwise or counter-clockwise about the lock-side shaft member 10 as a center of rotation passed through the shaft hole 5b. The shaft hole 5b is formed into a shape that matches the outer shape of the body portion 10c of the lock-side shaft member 10, in order to prevent the lock plate 5 from freely rotating relative to the lock-side shaft member 10.

The lock plate 5 is formed into the shape of the plate. At the right periphery when seen from the front which is a perimeter farther away from the rotation center of the lock plate 5, a lock-side cam portion 5a is formed. The lock-side cam portion 5a is a cam portion to be locked with the latch-side first locking portion 4i or the latch-side second locking portion 4g of the latch plate 4. A cam surface 5c that forms a lock-side cam portion 5a and a recessed portion 5e at the underside of the lock-side cam portion 5a are formed into the shapes that match the latch-side first locking portion 4i and the latch-side second locking portion 4g of the latch plate 4, respectively. The cam surface 5c is located far away from the rotation shaft, whereas a lower surface 5d of the lock plate 5 is located near the rotation shaft.

(Plate Pressing Cam)

As shown in FIGS. 4 and 5, the locking device for vehicle 30 includes a plate pressing cam 7. The plate pressing cam 7 is a member for depressing down a tip end 6c of a later-described rattle-removing plate 6. The plate pressing cam 7 includes a base portion 7b (see FIG. 5) and an arm portion 7a extending upward from the base portion 7b. The base portion 7b is piercedly formed with a shaft hole 7f (see FIG. 5) for passing, from the back surface, the lock-side shaft member 10 passed through the shaft hole 5b of the lock plate 5. The plate pressing cam 7 rotates about a lock-side shaft member 10 which is a rotation center common to the lock plate 5. The shaft hole 7f is formed into a shape different from the outer shape of the body portion 10c of the lock-side shaft member 10 (in this embodiment, a round shape), and is arranged so as not to interlock with the lock-side shaft member 10 at the time of rotation.

From the lower portion of the perimeter of the base portion 7b, a depressing-side cam portion 7e is protruded. The depressing-side cam portion 7e is a cam portion for depressing down the tip end 6c of the rattle-removing plate 6. The depressing-side cam portion 7e is formed into a size, shape and at a position such that the depressing-side cam portion 7e depresses down the tip end 6c of the rattle-removing plate 6 when the plate pressing cam 7 rotates clockwise, whereas it releases the depressing state when the plate pressing cam 7 rotates counter-clockwise from the pressing state.

At the tip end of the arm portion 7a, a locking member 7c for locking a locking portion 12a (see FIG. 5) provided at the left end of the coil spring 12 is formed. From the left surface of the arm portion 7a, a depression controlling portion 7d is protruded in a backward direction. The depression controlling portion 7d is depression controlling means for controlling the rotation of the lock plate 5. The depression controlling portion 7d restricts the clockwise rotation of the plate pressing cam 7 to prevent the depressing-side cam 7e from depressing down the tip end 6c of the rattle-removing plate 6 when the latch-side first locking portion 4i and the lock-side cam portion 5a are in a locked state with each other. As the lock plate 5 rotates counterclockwise when the locked state between the latch-side second locking portion 4g and the lock-side cam portion 5a is released, the depression controlling portion 7d rotates the plate pressing cam 7 in a direction in which the depressed state of the tip end 6c of the rattle-removing plate 6 by the depressing-side cam portion 7e is released.

In this embodiment, the plate pressing cam 7 is formed into the shape of plate, whereas the base portion 7b is formed into the shape of substantially circular plate. The arm portion 7a is formed into the shape of an elongated plate, whereas the locking portion 7c and the depression controlling portion 7d are processed to be bent, respectively.

(Rattle-Removing Plate)

The locking device for vehicle 30 includes a rattle-removing plate 6 that constitutes one of the characteristics of the present invention. As shown in FIGS. 4 and 5, the rattle-removing plate 6 includes a base end 6a, an arm portion 6b extending from the base end 6a toward the locking plate 5, and a tip end 6c extending from the arm portion 6b toward the lock plate 5 to reach the lower portion of the depressing-side cam portion 7e of the plate pressing cam 7. The arm portion 6b curves downward. Below the lower surface of the arm portion 6b, a rattle removing-side recessed portion 6d which is a recessed portion to be engaged with the peripheral surface of the striker 20 is formed.

The rattle removing-side recessed portion 6d is formed into a shape that matches the shape of the peripheral surface of the striker 20. In this embodiment, the rattle removing-side recessed portion 6d is formed into a semicircular shape, and wraps around the peripheral surface of the striker 20 and depresses the striker 20 to prevent it from rattling.

At the base end 6a, a shaft hole 6e (see FIG. 5) for passing the latch-side shaft member 11 passed through the latch plate 4 is piercedly formed. The rattle-removing plate 6 rotates about the latch-side shaft member 11 as a center of rotation common to the latch plate 4. However, the rattle-removing plate 6 does not interlock with the latch plate 4 at the time of rotation.

In this embodiment, the rattle-removing plate 6 is formed into the shape of plate. The arm portion 6b and the tip end 6c may be in the shape of bar, respectively. In such a case, it is preferable that the rattle removing recessed portion 6d is formed into the shape that matches the peripheral surface of the striker 20, in order that the rattle removing recessed portion 6d has a larger contact area with the peripheral surface of the striker 20.

(Free-Rotation Preventing Member)

The locking device for vehicle 30 includes a free-rotation preventing member 8 for preventing the rattle-removing plate 6 from freely rotating. As shown in FIGS. 4 to 7, the free-rotation preventing member 8 includes a cylindrical main body 8d, a helical spring packed into the main body 8d, and a shaft member 8a for fixing the coil spring 8d within the main body 8d. As shown in FIG. 4, one end 8b of the helical spring is inserted into the left side surface of the tip end 6c of the rattle-removing plate 6, whereas the other end 8c is locked with a locking portion 9m formed at the lower end of the rear base plate 9.

In a state where the depressing-side cam portion 7e of the plate pressing cam 7 does not depress the tip end 6c of the rattle-removing plate 6, upward and downward rotation of the rattle-removing plate 6 is prevented by an end 8b of the helical spring passed through the tip end 6c, so that the rattle-removing plate 6 is held at a predetermined position. When the depressing-side cam portion 7e of the plate pressing cam 7 depresses the tip end 6c of the rattle-removing plate 6, the tip end 6c rotates downward against the spring force of the helical spring. When the depressed state is released, the restoring force of the helical spring returns the rattle-removing plate 6 to the position before it rotates.

Alternatively, a coil spring may be used as a free-rotation preventing member 8. This coil spring is provided on the front surface of the rear base plate 9 at a position below the tip end 6c of the rattle-removing plate 6, so that the restoring force of the coil spring prevents the rattle-removing plate 6 from freely rotating.

(Operating Lever)

The locking device for vehicle 30 includes an operating lever 2 for releasing the locked state between the lock plate 5 and the latch plate 4. As shown in FIGS. 1, 2, 4, and 5, the operating lever 2 includes a base portion 2b, and an arm portion 2a extending obliquely upper-rightward from the base portion 2b. As shown in FIG. 5, the base portion 2b is piercedly formed with a shaft hole 2f for passing a lock-side shaft member 10 protruding from the shaft hole 1e of the front base plate 1. The shaft hole 2f is formed into the shape that matches the outer shape of the body portion 10c of the lock-side shaft member 10. When the operating lever 2 is operated to rotate, the lock-side shaft member 10 is rotated, and at the same time, the lock plate 5 is rotated.

On the upper end of the base portion 2b, a locking portion 2d for locking a locking portion 3a provided at the left end of the coil spring 3 is formed. A wire fixing portion 2c for fixing one end of an unillustrated wire is attached to the tip end of the arm portion 2a. The other end of the wire is fixed to a predetermined point of a vehicle seat onto which the locking device for vehicle 30 is mounted. For example, when the seat back (back rest) of the vehicle seat is tilted frontward, the wire described above is interlocked with this movement and pulled, and the operating lever 2 rotates counter-clockwise. And then, the locked state between the lock plate 5 and the latch plate 4 is released and the locking device for vehicle 30 is enabled to be released from the striker 20.

(Coil Spring)

The locking device for vehicle 30 includes coil springs 3, 12. A locking portion 3a provided at the left end of the coil spring 3 is locked with the locking portion 2d of the operating lever 2, whereas a locking portion 3b provided at the right end of the coil spring 3 is locked with the locking member 4f protruding from the window in of the front base plate 1. In other words, in a state where the operating lever 2 is not operated to rotate counter-clockwise, the latch plate 4 is biased in a direction along which it rotates counter-clockwise by the restoring force of the coil spring 3. Thereby, a state where the lock-side cam portion 5a of the lock plate 5 is locked with the latch-side second locking portion 4g of the latch plate 4, that is, a locked state, is maintained.

A locking portion 12a provided at the left end of the coil spring 12 is locked with the locking portion 7c of the plate pressing cam 7, whereas a locking portion 12b provided at a right end of the coil spring 12 is locked with the locking portion 9j of the rear base plate 9 protruding from the window 1j of the front base plate 1. In other words, in a locked state, the plate pressing cam 7 is biased in a direction along which it rotates clockwise by the restoring force of the coil spring 12. Thereby, the pressing-side cam portion 7e of the plate pressing cam 7 is depressed in the direction along which the rattle-removing plate 6 is rotated counter-clockwise, so that the rattle removing-side recessed portion 6d of the rattle-removing plate 6 is kept in a state where it is engaged with the peripheral surface of the striker 20.

It should be noted that helical springs may be used instead of the coil springs 3 and 4.

(Operation at the Time of Locking)

Next, an operation of each member at the time when the locking device for vehicle 30 is brought into a locked state will be described. Here, it is assumed that the locking device for vehicle 30 is in a state where the lock-side cam portion 5a of the lock plate 5 is locked with the latch-side first locking portion 4i of the latch plate 4, as shown in FIG. 8(1), whereas the latch-side recessed portion 4d of the latch plate 4 is not engaged with the peripheral surface of the striker 20.

The lock plate 5 is biased in the direction along which it rotates clockwise together with the operating lever 2 biased in the direction along which it rotates clockwise by the restoring force of the coil spring 3 (see FIG. 1). Further, the latch plate 4 is biased in the direction along which it rotates counter-clockwise by the restoring force of the coil spring 3 locked with the locking member 4f provided to the latch plate 4 itself. In other words, the restoring force of the coil spring 3 keeps the lock plate 5 and the latch plate 4 in a lock-off state.

Further, the depression controlling portion 7d of the plate pressing cam 7 is locked with the left side surface 5f of the lock plate 5, so that the clockwise rotation of the plate pressing cam 7 by the restoring force of the coil spring 12 is restricted. Due to this restriction, the depressing-side cam portion 7e of the plate pressing cam 7 is kept in a state where it does not depress the tip end 6c of the rattle-removing plate 6.

When the vehicle seat provided with the locking device for vehicle 30 is tilted toward the striker 20, the upper end inside the latch-side recessed portion 4d of the latch plate 4 is pushed upward by the peripheral surface of the striker 20. As a result, the latch plate 4 starts to rotate clockwise against the restoring force of the coil spring 3.

At this time, the lock plate 5 does not rotate, but the lock-side cam portion 5a is simply in contact with the perimeter of the latch plate 4.

Then, as shown in FIG. 8(2), when the latch-side recessed portion 4d of the latch plate 4 is engaged with the peripheral surface of the striker 20 and the top of the lock-side cam portion 5a of the lock plate 5 goes downward beyond the top of the protruding portion 4a of the latch plate 4, the lock plate 5 rotates clockwise by the restoring force of the coil spring 3. On the other hand, the latch plate 4 rotates counter-clockwise by the restoring force of the coil spring 3.

Further, as shown in FIG. 8(3), when the lock plate 5 starts to rotate clockwise, the plate pressing cam 7 locked with the left side surface 5f of the lock plate 5 is released from the restricted state by the depression controlling portion 7d. Thus, the plate pressing cam 7 starts to rotate clockwise, and the depressing-side cam portion 7e starts to depress the tip end 6c of the rattle-removing plate 6. In other words, the plate pressing cam 7 rotates by the restoring force of the coil spring 12 after the latch-side recessed portion 4d is pressed by the striker 20 and the locked state between the latch-side first locking portion 4i and the lock-side cam portion 5a is released. Then, the depressing-side cam portion 7e depresses the tip end 6c of the rattle-removing plate 6, so that the rattle removing-side recessed portion 6d is engaged with the peripheral surface of the striker 20.

Therefore, when the latch-side recessed portion 4d is pushed by the striker 20, the rattle-removing plate 6 does not operate to push back the striker 20. Thereby, a small force is sufficient for the striker 20 to enter the latch-side recessed portion 4d.

Then, as shown in FIG. 8(4), as the lock plate 5 further rotates clockwise, the plate pressing cam 7 also rotates clockwise accordingly, so that the depressing-side cam portion 7e further depresses the tip end 6c of the rattle-removing plate 6.

Then, as shown in FIG. 8(5), when the lock-side cam portion 5a of the lock plate 5 comes into the state where it is locked with the latch-side second locking portion 4g of the latch plate 4, the clockwise rotation of the lock plate 5 stops, and the counter-clockwise rotation of the latch plate 4 also stops accordingly. At this time, the rattle removing-side recessed portion 6d of the rattle-removing plate 6 is engaged with the peripheral surface of the striker 20, so that the counter-clockwise rotation of the rattle-removing plate 6 stops.

The rattler removing-side recessed portion 6d is engaged with the peripheral surface of the striker 20 that faces the peripheral surface with which the latch-side recessed portion 4d is engaged. Thus, the striker 20 is brought into a state where its peripheral surface is pinched between the rattle removing-side recessed portion 6d and the latch-side recessed portion 4d. Thereby, occurrence of rattle at the engagement portion of the striker 20 can be strictly suppressed.

At the same time when the rattle-removing plate 6 stops, the clockwise rotation of the plate pressing cam 7 which has depressed the tip end 6c of the rattle-removing plate 6 stops. At this time, the striker 20 is brought into the state where it is engaged with the respective recessed portions, that is, the latch-side recessed portion 4d of the latch plate 4, the front base-side recessed portion 1d of the front base plate 1, the rear base-side recessed portion 9d of the rear base plate 9, and the rattle removing-side recessed portion 6d of the rattle-removing plate 6.

At this time, a clearance is created between the depression controlling portion 7d of the plate pressing cam 7 and the left side surface 5f of the lock plate 5. That is, even if the rotation stop position of the lock plate 5 deviates in a counter-clockwise direction with respect to the designed position due to the error in manufacturing the lock plate 5 and the latch plate 4, the clearance described above enables the plate pressing cam 7 to further rotate clockwise, so that the depressing-side cam portion 7e depresses the tip end 6c of the rattle-removing plate 6 and the rattle removing-side recessed portion 6d engages with the striker 20. Thereby, occurrence of rattle in the striker 20 can be suppressed.

(Operation at the Time of Lock-Off)

When the seat back (back rest) of the vehicle seat is tilted forward, the wire fixed to the wire fixing portion 2c of the operating lever 2 is pulled, and the operating lever 2 (FIG. 1) rotates counter-clockwise against the restoring force of the coil spring 3. Simultaneously, the lock plate 5 interlocking with the operating lever 2 starts to rotate counter-clockwise (FIG. 8(4)). Thus, the lock-side cam portion 5a of the lock plate 5 pushes the protruding portion 4a of the latch plate 4 upward, and the latch plate 4 rotates clockwise against the restoring force of the coil spring 3.

At the same time when the lock plate 5 rotates counter-clockwise, the left side surface 5f of the lock plate 5 depresses the depression controlling portion 7d of the plate pressing cam 7 in the counter-clockwise direction, so that the plate pressing cam 7 rotates counter-clockwise. Thereby, the peripheral surface of the striker 20 is released from the state where it is depressed by the rattle removing-side recessed portion 6d of the rattle-removing plate 6.

Then, when the lock-side cam portion 5a of the lock plate 5 goes beyond the protruding portion 4a of the latch plate 4 upward (FIG. 8(2)), the engagement between the lock-side cam portion 5a and the latch-side second locking portion 4g of the latch plate 4 is released, so that the latch plate 4 rotates counter-clockwise by the restoring force of the coil spring 3.

Further, the lock plate 5 rotates clockwise by the restoring force of the coil spring 3. Then, the lock-side cam portion 5a of the lock plate 5 engages with the latch-side first locking portion 4i of the latch plate 4 (FIG. 8(1)). Since the depression controlling portion 7d is locked with the left side surface 5f of the lock plate 5, the clockwise rotation of the plate pressing cam 7 by the restoring force of the coil spring 12 is restricted, so that the depression to the tip end 6c of the rattle-removing plate 6 by the depressing-side cam portion 7e is prevented.

Further, the striker 20 departed from the respective recessed portions, that is, the front base-side recessed portion 1d of the front base plate 1, the rear base-side recessed portion 9d of the rear base plate 9, the latch-side recessed portion 4d of the latch plate 4, and the rattle removing-side recessed portion 6d of the rattle-removing plate 6. Thereby, the locked state between the locking device for the vehicle 30 and the striker 20 is released to create a lock-off state where the forward rotation of the vehicle seat is enabled. At this time, a rotation moment is exerted counter-clockwise to the rattle-removing plate 6 departed from the peripheral surface of the striker 20 due to its own weight. However, rotation of the rattle-removing plate 6 is prevented by one end 8b of the helical spring of the free-rotation preventing member 8 inserted into the tip end 6c of the rattle-removing plate 6. That is, free rotation of the rattle-removing plate 6 is prevented by the free rotation preventing member 8. In the lock-off state, the tip end 6c is kept in contact with the depressing-side cam portion 7e of the plate pressing cam 7 to be ready for the next engagement.

Effect of Embodiment (1) By practicing the locking device for vehicle 30 according to the foregoing embodiment, since the rattle removing-side recessed portion 6d of the rattle-removing plate 6 is formed into the shape that matches the peripheral surface of the striker 20, the rattle removing-side recessed portion 6d has a large area for engagement with the striker 20, and large friction arises at the engagement portion. Thus, there is no possibility that the striker 20 engaged with the rattle removing-side recessed portion 6d moves to rattle.

(2) It is sufficient to provide only three pieces of biasing means in total, that is, the coil springs 3, 12, and the free rotation preventing member 8, to the locking device for vehicle 30. Thereby, the number of the biasing means can be reduced by one than the conventional device (Prior art 1).

Since the number of the biasing means is reduced by one, the frequency of occurrence of failure resulted from the reduction in the biasing force of the biasing means can be lowered. Further, the proportion of the manufacturing cost for the biasing means to the manufacturing cost for the locking device for vehicle can be reduced by the reduced one piece of the biasing means.

(3) Further, when the latch-side recessed portion 4d of the latch plate 4 is pushed by the striker 20, the rattle-removing plate 6 does not push back the striker 20. Thus, small force is sufficient for the striker 20 to enter the latch-side recessed portion 4d.

(4) Further, since the rattle removing-side recessed portion 6d of the rattle-removing plate 6 is engaged with the peripheral surface of the striker 20 that faces the peripheral surface with which the latch-side recessed portion 4d of the latch plate 4 is engaged, the striker 20 is brought into a state where its peripheral surface is pinched between the rattle removing-side recessed portion 6d and the latch-side recessed portion 4d. Thereby, occurrence of rattle at the engagement portion of the striker 20 can be strictly suppressed.

(5) Further, the lock plate 5, the plate pressing cam 7, and the operating lever 2 are pivotally supported by one and the same lock-side shaft member 10. The latch plate 4 and the rattle-removing plate 6 are pivotally supported by one and the same latch-side shaft member 11. Since the number of the shaft members can be suppressed to minimum, the device can be small-sized and light-weighted.

(6) The depressing-side cam portion 7e of the plate pressing cam 7 is eccentric from the rotation center of the plate pressing cam 7, and the tip end 6c exists on the trail created by the depressing-side cam portion 7e. Thus, even if there is some error in the protruding height of the depressing-side cam portion 7e or the shape of the tip end 6c, the tip end 6c can be depressed by the depressing-side cam portion 7e, so that the rattle removing-side recessed portion 6d can be engaged with the peripheral surface of the striker 20.

(7) The rattle removing-side recessed portion 6d is in the shape wrapping around the peripheral surface of the striker 20, and strongly engages with the striker 20. Even if forces are exerted to the striker 20 in various directions, there is no possibility that rattle occurs at the engagement portion of the striker 20.

The locking device for vehicle 30 may be applicable as a device for locking the seat back of vehicle seat with the vehicle body, or alternatively, as a device for locking the side door or the back door of the vehicle with the vehicle body.

Alternatively, the depression controlling portion may be provided to the plate surface of the front side of the lock plate 5. For example, in the state shown in FIG. 8(1), a depression controlling portion which is in contact with the right side surface of the plate pressing cam 7, for restricting the clockwise rotation of the plate pressing cam 7 by the restoring force of the coil spring 12 is formed to protrude from the plate surface of the lock plate 5.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. A locking device for a vehicle, comprising:
   a base plate having a base-side recessed portion which engages a striker mounted to the vehicle;
   a latch plate having a latch-side recessed portion, which engages the striker, a latch-side first locking portion, and a latch-side second locking portion;
   a lock plate having a lock-side cam portion which locks with the latch-side first locking portion to keep the latch-side recessed portion unengaged with the striker, and which locks with the latch-side second locking portion to keep the latch-side recessed portion engaged with the striker;
   a latch-side shaft member having a base portion, a body portion and a tip end protruding through a shaft hole in a plate surface of the base plate for pivotally supporting the latch plate;
   a lock-side shaft member having a base portion, a body portion and a tip end protruding through a shaft hole in the plate surface of the base plate for pivotally supporting the lock plate;
   a rattle-removing member having a base end pivotally supported by the latch-side shaft member protruding through a shaft hole in the plate surface of the latch plate, an arm portion extending from the base end toward the lock plate, and a tip end extending from the arm portion toward the lock plate, the arm portion curves downward toward the tip end, and below a lower surface of the arm portion, between the tip end and the base end, is a recessed portion that engages with a peripheral surface of the striker;
   a depressing member pivotally supported by the lock-side shaft member protruding through a shaft hole from the plate surface of the lock plate having a depression-side cam portion, the depressing member rotates causing the depression-side cam portion to contact and depress the tip end of the rattle-removing member when the device is in a locked state between the latch-side first locking portion and the lock-side cam portion changes into a locked state between the latch-side second locking portion and the lock-side cam portion;
   biasing means for depressing the depressing member to rotate in a direction in which the depression-side cam portion depresses the tip end of the rattle-removing member;
   an operating member having a base end pivotally supported by the lock-side shaft member protruding through a shaft hole from one surface of the depressing member for rotating interlockingly with the lock plate;
   a depression controlling means for restricting the rotation of the depressing member to prevent the depression-side cam portion from depressing the tip end of the rattle-removing member when the latch-side first locking portion and the lock-side cam portion are in a locked state with each other, and as the lock plate rotates counterclockwise when the locked state between the latch-side second locking portion and the lock-side cam portion is released, the depressing member rotates the depressing member in a direction in which the depressed state of the tip end of the rattle-removing member by the depression-side cam portion is released;
   biasing means for locking the operating member and the latch plate to respectively rotate in a direction in which a locked state between the latch-side first locking portion or the latch-side second locking portion and the lock-side cam portion is kept; and
   free rotation preventing biasing means for biasing the tip end of the rattle-removing member to prevent the rattle-removing member from freely rotating in a state where the rattle-removing member is not depressed by the depressing member,
   wherein the base-side recessed portion, the latch-side recessed portion, and the rattle removing-side recessed portion are structured to be engaged with the striker during a latching operation.

2. The locking device for vehicle according to claim 1, wherein, when the striker is inserted into the base-side recessed portion in a state where the latch-side first locking portion and the lock-side cam portion are locked with each other, whereas the base-side recessed portion, the latch-side recessed portion, and the rattle removing-side recessed portion are not engaged with the striker, the latch-side recessed portion is pushed by the striker to cause the latch plate to rotate against the biasing force of the biasing means for locking, and when the locked state between the latch-side first locking portion and the lock-side cam portion is released, the latch plate rotates in a direction in which the latch-side second locking portion and the lock-side cam portion are locked with each other by the biasing force of the biasing means for locking, and as this rotation proceeds, the depressing member is released from the restriction by the depression controlling means and is rotated by the biasing force of the biasing means for depression, so that the latch-side second locking portion and the lock-side cam portion are locked with each other to engage the latch-side recessed portion with the striker, and the depressing-side cam portion depresses the tip end of the rattle-removing member to engage the rattle removing-side recessed portion with the peripheral surface of the striker.

3. The locking device for vehicle according to claim 2, wherein the rattle removing-side recessed portion is engaged with a peripheral surface of the striker that faces the peripheral surface with which the latch-side recessed portion is engaged.

4. The locking device for vehicle according to claim 1, wherein the rattle removing-side recessed portion is engaged with a peripheral surface of the striker that faces the peripheral surface with which the latch-side recessed portion is engaged.

* * * * *